July 2, 1968  A. E. TSCHANZ  3,390,589
MOTION TRANSMITTING REMOTE CONTROL ASSEMBLY
Filed May 23, 1966
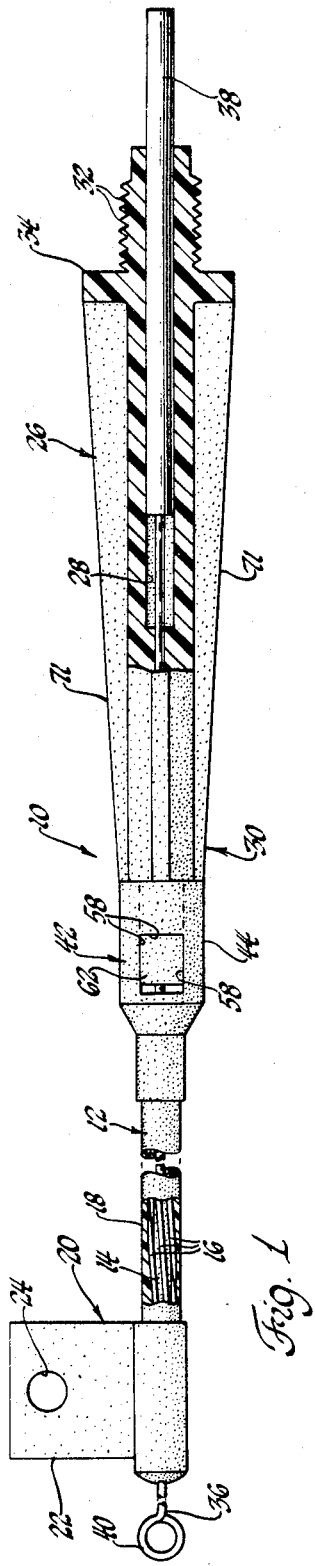
INVENTOR.
August E. Tschanz
BY
Barnard, McGlynn & Leising
ATTORNEYS United States Patent Office 3,390,589
Patented July 2, 1968

3,390,589
MOTION TRANSMITTING REMOTE
CONTROL ASSEMBLY
August E. Tschanz, Birmingham, Mich., assignor to Teleflex Incorporated, North Wales, Pa., a corporation of Delaware
Filed May 23, 1966, Ser. No. 552,072
7 Claims. (Cl. 74—501)

ABSTRACT OF THE DISCLOSURE

A motion transmitting remote control assembly including a conduit, a fitting adapted for attachment to a support structure with a male section on one end thereof, a socket means disposed on one end of the conduit for receiving and retaining the male section in mechanical interlocking engagement therewith, the male section having means projecting radially outwardly therefrom and being movable radially inwardly for being snapped into mechanical interlocking engagement with the socket means, and a motion transmitting core element movably disposed through the conduit and the fitting.

---

Motion transmitting remote control assemblies of the type to which the instant invention pertains are frequently utilized in marine, aircraft, and automotive installations and usually include a conduit with fittings disposed adjacent each end for attaching the conduit to a support structure, and a motion transmitting core element movably disposed in the conduit. One end of the core element is usually adapted to be manually moved and the other end is adapted to be attached to a control member of a device to be actuated. Assemblies of this type are frequently utilized in automobiles to control such things as vents, heaters, and the like. A typical conduit utilized in such assemblies includes an inner tubular member of organic polymeric material with a plurality of wires wrapped about the inner tubular member on a long lead and a casing of organic polymeric material surrounding the wires and the inner tubular member. Fittings are secured to the casing and are adapted to be attached to a support structure.

One of the problems associated with such assemblies is to secure the fittings to the conduit without applying excessive radial forces to the conduit, which would deform the conduit and interfere with movement of the motion transmitting core element, yet provide sufficient securement between the fitting and the conduit to prevent the conduit from being pulled from the fitting.

One solution to this problem is to mold a fitting of organic polymeric material about the casing of the conduit so that the organic polymeric material of the casing of the conduit is diffused with the organic polymeric material of the fitting, thus providing an assembly wherein the fitting is secured to the conduit to prevent relative axial movement between the fitting and the conduit. When the fitting is molded about the conduit, it is also formed into the particular configuration desired for the installation in which it is to be utilized. Such fittings are frequently of very complex shapes making it impossible to mold the fitting in situ about a conduit due to the cost and/or the tooling complexity involved. For example, when such remote control assemblies are utilized in automobiles, the fittings are disposed in the instrument panel area and frequently form a visible portion of the instrument panel. It is often necessary to dispose the fittings in baking ovens for painting or other treatment, but fittings molded in situ about a conduit frequently cannot be so treated because of the high temperatures which damage the organic polymeric materials of the conduit.

Furthermore, in order to obtain diffusion between the organic polymeric material of the fitting and the organic polymeric material of the outer surface of the conduit, it is necessary that the two materials be compatible for bonding. It is desirable, however, in many instances to utilize an organic polymeric material for the fitting which is not compatible for bonding to the organic polymeric material of the conduit. For example, many organic polymeric materials which are compatible for bonding to the organic polymeric material of the conduit do not possess the requisite strength characterstics necessary for particular installations and it is, therefore, necessary to utilize an organic polymeric material for the fitting which has high strength characteristics but is not compatible for bonding to the organic polymeric material of the conduit.

It is, therefore, an object and feature of this invention to provide a motion transmitting remote control assembly having a socket means molded of organic polymeric material on one end of the conduit and an end fitting molded of organic polymeric material to include a male section which is inserted into the socket means thereby providing a mechanical interlock between the socket means and the male section so that the fitting may be preformed separately and subsequently mechanically attached to the conduit.

In general, these and other objects and features of this invention may be attained in a motion transmitting remote control assembly including a conduit comprising an inner tubular member of organic polymeric material surrounded by a plurality of wires wrapped helically on a long lead about the inner tubular member and a casing of organic polymeric material surrounding the wires and the inner tubular member. A socket means of organic polymeric material is molded about one end of the conduit, and the organic polymeric material of the socket means is compatible with the organic polymeric material of the casing so that the organic polymeric material of the socket means and the organic polymeric material of the casing are diffused into one another to prevent relative axial movement between the casing and the socket means. A fitting of the desired shape is molded separately of a selected organic polymeric material so as to include a male section at one end. The socket means includes a cavity for receiving and retaining the male section in mechanical interlocking engagement. A motion transmitting core element is movably disposed in the inner tubular member of the conduit and extends through a bore in the fitting.

Other objects and attendant advantages of the present invention will be readily appreciated as the same becomes better understood by reference to the following detailed description when considered in connection with the accompanying drawings wherein:

FIGURE 1 is a view partly broken away and in cross section of a preferred embodiment of the instant invention;

FIGURE 2 is a fragmentary cross-sectional view of a portion of the embodiment illustrated in FIGURE 1;

FIGURE 3 is a cross-sectional view taken substantially along line 3—3 of FIGURE 2;

FIGURE 4 is a fragmentary cross-sectional view similar to FIGURE 2 but showing the respective components in a disengaged position; and FIGURE 5 is a fragmentary perspective view of the components illustrated in FIGURES 2 and 4.

Referring now to the drawings, wherein like numerals indicate like or corresponding parts throughout the several views, a motion transmitting remote control assembly is generally shown at 10. The assembly includes a conduit, generally indicated at 12, and including an inner tubular member 14 of organic polymeric material and having a bore therethrough, a plurality of wires 16 wrapped helically about the inner tubular member 14 on a long lead, and a casing 18 of organic polymeric material surrounding the wires 16 and the inner tubular member 14. A fitting, generally indicated at 20, is disposed about one end of the conduit 12 and is adapted by the flange 22 and the hole 24 to be attached to a support structure.

A preformed fitting, generally indicated at 26, is molded of an organic polymeric material and has a bore 28 therethrough and a male section on one end which is generally indicated at 30. Fitting 26 is adapted by the threads 32 and the flange 34 for attachment to a support by inserting the threads 32 through a hole so that the flange 34 abuts the material surrounding the hole and disposing a nut on the threads to retain the fitting 26 in position. It will be understood that the fitting 26 may be one of many widely divergent configurations.

A motion transmitting core element 36 is movably disposed in the inner tubular member 14 of the conduit 12 and extends through a bore in the fitting 26 and is attached to a slider bar 38. The other end of the motion transmitting core element 36 has a loop portion 40 for attachment to an element of a device to be actuated. Normally, the slider member 38 has a knob attached to its distal end for manually moving the core element.

A socket means, generally indicated at 42, is molded of an organic polymeric material about one end of the conduit 12 with a diffusion between the organic polymeric material of the socket means 42 and the organic polymeric material of the casing 18 so as to prevent relative axial movement between the casing 18 and the socket means 42. The socket means 42 includes a cantilevered section 44 which extends from the end 46 of the conduit 12 so that a portion of the cantilevered section 44 abuts the end 46 of the conduit 12. A cavity extends into the cantilevered section 44 axially from the end 48 of the socket means and includes a base surface 50 which is spaced from the end 46 of the conduit 12. The cavity is defined by a pair of parallel side surfaces 52 and a pair of tapered arcuate surfaces 54 which interconnect the side surfaces 52. The tapered arcuate surfaces 54 are tapered radially inwardly in a direction axially into the cantilevered section 44 from the end 48. A conical bore 56 extends through the base surface 50 to communicate between the cavity and the bore in the inner tubular member 14. A passage having a rectangular cross section as defined by the three walls 58 and the base surface 50 extends transversely through the cantilevered section 44 to intersect the cavity so as to provide or define a larger portion of the cavity.

The male section 30 includes a pair of parallel sides 60 which are interconnected by a first and a second pair of arcuate sides 62 and 64 respectively. Each of the arcuate sides 62 of the first pair extend axially from the end of the male section 30 to a radially inwardly extending surface 66. The first pair of arcuate sides 62 are tapered radially outwardly from the end of the male section 30 to the radially inwardly extending surfaces 66. Each of the arcuate sides 64 of the second pair extends axially from one of the radially inwardly extending surfaces 66 to the radially outwardly extending shoulder generally indicated at 67. The shoulder may take one of various forms but as illustrated includes a radially outwardly extending annular portion and the ends 69 of the strengthening ribs 71 of the fitting 26. The arcuate sides 64 are tapered radially outwardly in a direction away from the radially inwardly extending surfaces 66. The male section 30 also includes a V-shaped recess 68 which extends axially from the end of the male section and passes through the male section between the parallel sides 60.

The male section 30 is insertable into the cavity of the socket means 42 so that the first pair of arcuate sides 62 contact the tapered arcuate surfaces 54 to move the first pair of arcuate sides 62 toward one another as allowed by the V-shaped recess 68. The male section 30 is moved into the socket means 42 until the radially inwardly extending surfaces 66 reach the wall 58 of the passage extending transversely through the cantilevered section 44 where the first pair of arcuate sides 62 move apart and the male section 30 is retained in the cavity in the socket means 42 by way of mechanical interlocking engagement between the radially inwardly extending surfaces 66 and a wall 58 of the passage extending transversely through the cantilevered section 44. When the male section 30 is in such mechanical interlocking engagement with the socket means 42, the second pair of arcuate sides 64 of the male section engage the tapered arcuate surfaces 64 in the cavity and the radially outwardly extending shoulder 67 abuts the end 48 of the cantilevered section 44 of the socket means 42, thus preventing relative radial and axial movement between the socket means 42 and the fitting 26. The parallel sides 60 of the male section 30 engage the parallel surfaces 52 of the cavity when the male section 30 is disposed in mechanical interlocking engagement with the socket means 42 to prevent relative rotation between the fitting 26 and the conduit 12. The male section 30 may be disengaged from the socket means 42 by moving the first pair of arcuate surfaces 62 together by a means inserted into the passage extending transversely through the cantilevered section 44.

As most clearly shown in FIGURE 2, the core element 36 is movably disposed in the bore of the inner tubular member 14 of the conduit 12 and extends through the conical bore 56 and through the bore in the fitting 26.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims which follow, the invention may be practiced otherwise than as specifically described.

The embodiments of the invention in which an exclusive property or privilege is claimed are defined as follows:

1. A motion transmitting remote control assembly comprising: a conduit including an inner tubular member of organic polymeric material and having a bore therethrough, a plurality of wires wrapped helically about said inner tubular member on a long lead, and a casing of organic polymeric material surrounding said wires and said inner tubular member; a socket means of organic polymeric material disposed about one end of said conduit to prevent relative axial movement between said casing and said socket means, said socket means including a cantilevered section extending from said one end of said conduit with a portion of said cantilevered section abutting said one end of said conduit, a cavity extending into said cantilevered section from the end of said cantilevered section and having a base surface spaced from said one end of said conduit, said cavity having a pair of parallel side surfaces interconnected by a pair of tapered arcuate surfaces, said arcuate surfaces being tapered radially inwardly in a direction axially into said cantilevered section from said end thereof, a conical bore extending through said base surface to communicate between said cavity and said bore in said inner tubular member, a passage having walls defining a rectangular cross section and extending transversely through said cavity in said cantilevered section; a preformed fitting of organic polymeric material having a bore therethrough and a male section on one end thereof, said fitting being adapted for attachment to a support, said male section having a pair of parallel sides interconnected by a first and second pair of arcuate sides, each of said arcuate sides of said first pair extending axially from the end of said male section to a radially inwardly extending surface, said first pair of arcuate sides being tapered radially outwardly from said end of said male section to said radially inwardly extending surfaces, each of said arcuate sides of said second pair extending axially from said radially inwardly extending surfaces to a radially outwardly extending shoulder and being tapered radially outwardly in a direction away from said radially inwardly extending surfaces, said male section having a V-shaped recess extending axially from said end thereof and passing through said male section between said parallel sides thereof, said male section being insertable into said cavity so that said first pair of arcuate sides thereof contact said tapered arcuate surfaces of said cavity to move said first pair of arcuate sides of said male section toward one another as allowed by said V-shaped recess until said radially inwardly extending surfaces reach said passage extending transversely through said cantilevered section where said first pair of arcuate sides of said male section move apart and said male section is retained in said cavity in said socket means by way of a mechanical interlock between said radially inwardly extending surfaces of said male section and a wall of said passage in said cantilevered section as said second pair of arcuate sides engage said tapered arcuate surfaces of said cavity and said end of said cantilevered portion abuts said shoulder of said male section; and a motion transmitting core element movably disposed in said bore in said inner tubular member and extending through said conical bore and through said bore in said fitting.

2. A motion transmitting remote control assembly comprising: a conduit, a fitting including means for attachment to a support and a male section on one end thereof, socket means disposed about one end of said conduit for receiving and retaining said male section in mechanical interlocking engagement therewith, said socket means including a cavity therein having a pair of oppositely disposed tapered surfaces which extend to a wall defining a larger portion of said cavity, said male section having a first pair of oppositely disposed tapered sides which extend from a first end to a pair of inwardly extending surfaces, said tapered sides being divided by a recess extending into said male section from said end thereof, said male section being of a material flexible enough to allow said tapered sides to move toward one another so that said male section may be inserted into said socket means to engage said tapered sides thereof with said tapered surfaces of said cavity to move said tapered sides of said male section together until said radially inwardly extending surfaces reach the larger portion of said cavity and said tapered sides of said male section move apart and said radially inwardly extending surfaces abut said wall in said cavity for retaining said male section in mechanical interlocking engagement with said socket means, and a motion transmitting core element movably disposed in said conduit and said fitting.

3. A motion transmitting remote control assembly comprising: a conduit, a fitting adapted for attachment to a support and including a male section on one end thereof, socket means disposed about one end of said conduit for receiving and retaining said male section in mechanical interlocking engagement therewith, and a motion transmitting core element movably disposed in said conduit and said fitting, said socket means including a cavity therein having a pair of oppositely disposed tapered surfaces which extend to a wall defining a larger portion of said cavity, said male section having a first pair of oppositely disposed tapered sides which are movable toward one another and extend to a pair of inwardly extending surfaces so that said male section is inserted into said socket means to engage said tapered sides thereof with said tapered surfaces of said cavity to move said tapered sides of said male section together until said radially inwardly extending surfaces reach the larger portion of said cavity and said tapered sides of said male section move apart and said radially inwardly extending surfaces abut said wall in said cavity for retaining said male section in mechanical interlocking engagement with said socket means, said male section including a second pair of oppositely disposed tapered sides juxtaposed axially of said first pair of tapered sides for disposition coextensively with and engaging said tapered surfaces of said cavity when said male section is disposed in said mechanical interlocking engagement with said socket means.

4. A motion transmitting remote control assembly as set forth in claim 3 wherein said male section includes a radially outwardly extending shoulder adjacent said second pair of tapered sides for abutting the end of said socket means when said male section is disposed in said mechanical interlocking engagement with said socket means.

5. A motion transmitting remote control assembly as set forth in claim 4 wherein said male section includes a pair of parallel sides interconnecting said first and second pairs of tapered sides, said cavity having a pair of parallel surfaces extending between said tapered surfaces, said parallel sides of said male section engaging said parallel surfaces of said cavity to prevent relative rotation between said fitting and said conduit when said male section is disposed in said mechanical interlocking engagement with said socket means.

6. A motion transmitting remote control assembly as set forth in claim 5 including a motion transmitting core element movably disposed in said conduit and extending through a bore in said fitting.

7. A motion transmitting remote control assembly as set forth in claim 6 wherein said conduit includes an outer surface or organic polymeric material and said socket means is of organic polymeric material molded about said conduit so that the organic polymeric materials of said conduit and said socket means are diffused together to prevent relative axial movement between said conduit and said socket means.

References Cited

UNITED STATES PATENTS

| | | | |
|---|---|---|---|
| 921,691 | 5/1909 | Friday. | |
| 1,648,524 | 11/1927 | Winning | 74—503 |
| 2,891,103 | 6/1959 | Swengel | 339—91 |
| 3,004,238 | 10/1961 | Damon | 339—258 X |
| 3,146,051 | 8/1964 | Woofter et al. | |
| 3,289,491 | 12/1966 | Conrad | 74—501 |

FRED C. MATTERN, Jr., *Primary Examiner.*

C. F. GREEN, *Assistant Examiner.*